Sept. 21, 1926.  
J. O. COX  
FLYTRAP  
Filed Jan. 18, 1924

INVENTOR.  
John O. Cox  
BY Warren D House  
His ATTORNEY.

Witness:  
R H Hamilton

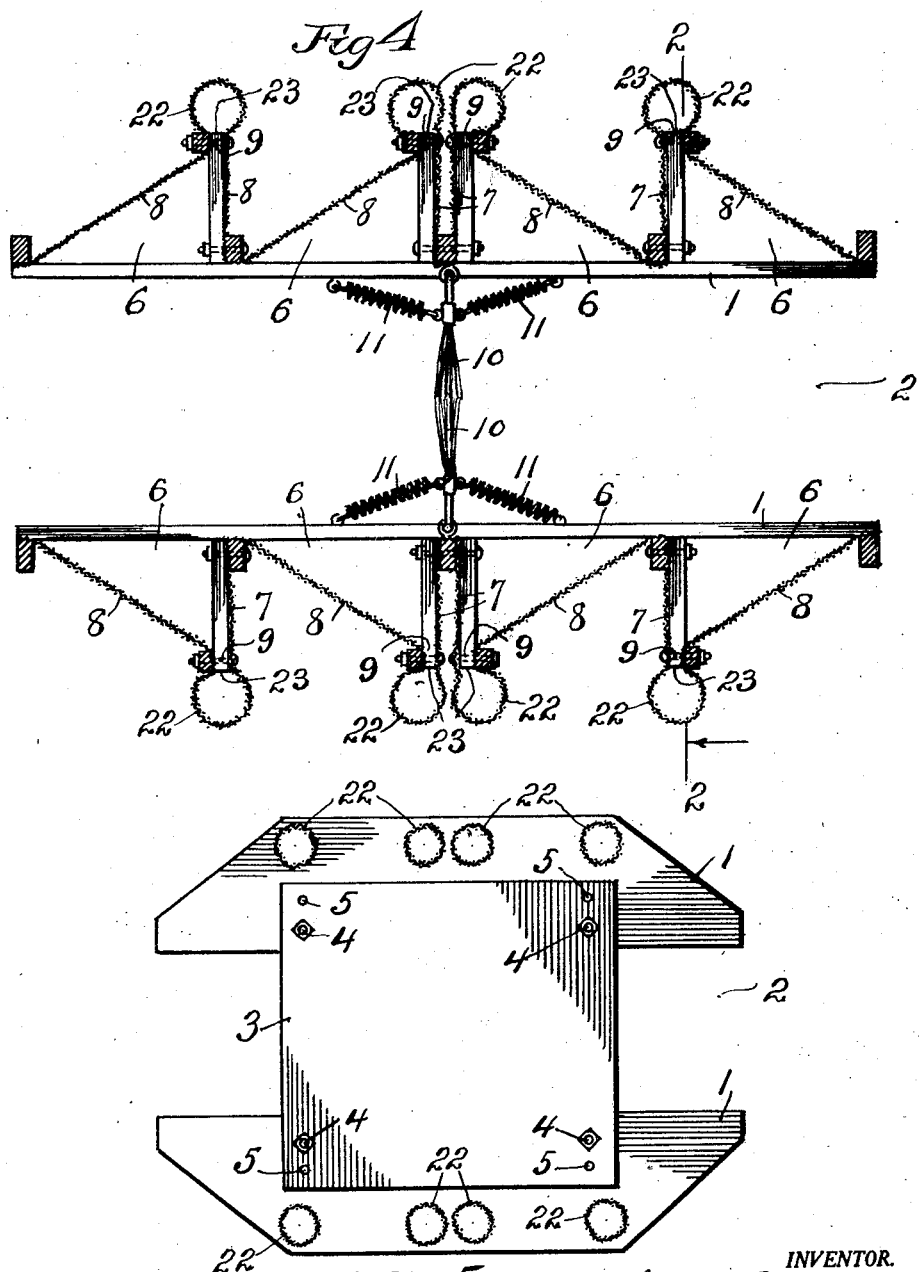

Patented Sept. 21, 1926.

1,600,454

UNITED STATES PATENT OFFICE.

JOHN O. COX, OF COLONY, KANSAS.

FLYTRAP.

Application filed January 18, 1924. Serial No. 687,000.

My invention relates to improvements in fly traps, particularly adapted for use in catching insects, such as flies, from live stock.

One of the objects of my invention is to provide a novel trap of the kind described, which is simple, cheap to make, strong, durable, not liable to get out of order, which has a large capacity for the rapid removal of flies, from a large number of animals, which will be used voluntarily by the animals to free them from flies, and which may be adjusted for use with animals of different sizes.

The novel features of my invention are hereinafter fully described and claimed.

Fig. 4 is a horizontal sectional view on the line 4—4 of Fig. 2.

Fig. 5 is a plan view of the two frames and roof connecting them.

Similar reference characters designate similar parts in the different views.

Figure 1:
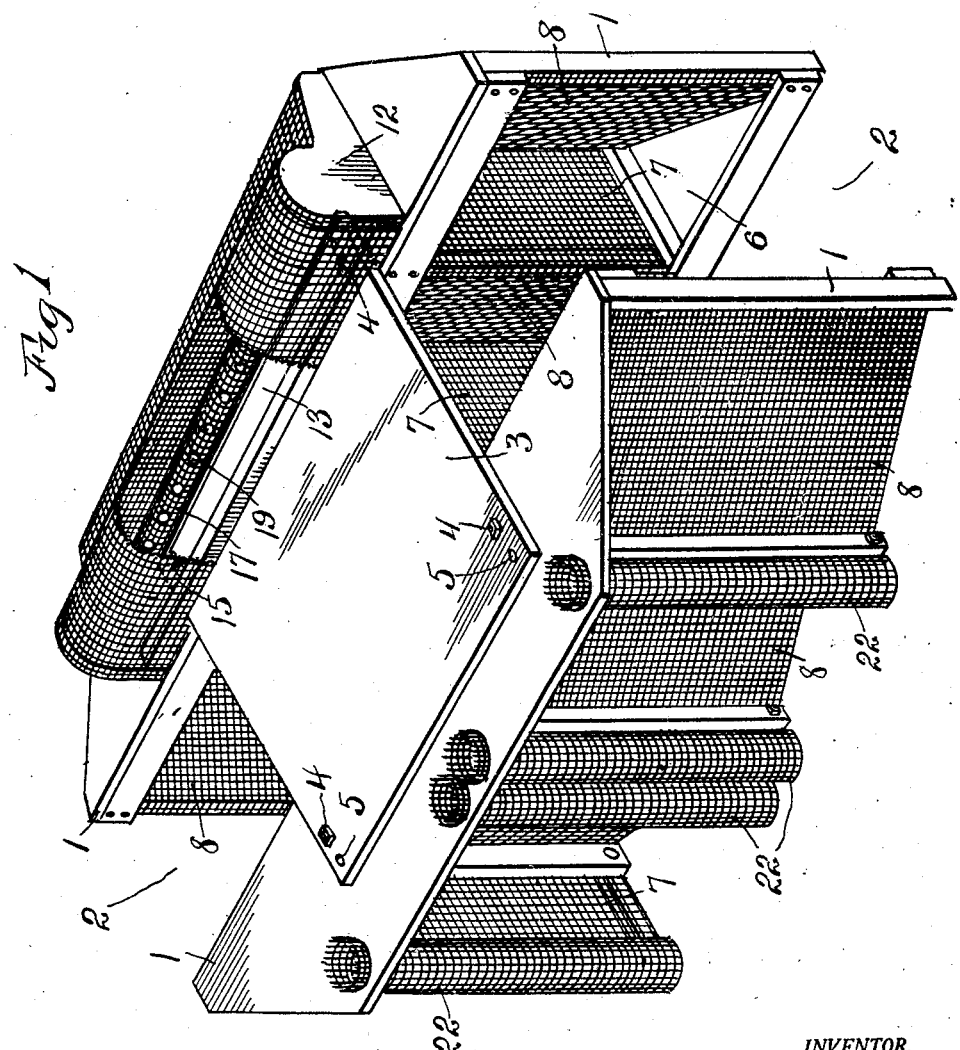
Fig. 1 is a perspective view, partly broken away, and parts removed, of my improved fly trap.

1 designates each of two similarly constructed frames, which are spaced apart so as to form between them a passage 2, through which animals comprising live stock, such as horses, cows, sheep or hogs hay pass to free themselves from flies and similar insects.

To accommodate the trap for animals of different sizes, and to change the width to suit conditions of location, the frames 1, which are set upon the ground, are adjustable toward and from each other to narrow or widen the passage 2 and to narrow or widen the trap.

For holding the frames 1 in their adjusted position, a horizontal bracing member, which may be a board roof 3, extends across the passage 2, and is mounted upon the upper ends of the frames 1, to which it is secured by means of vertical bolts 4. For receiving the bolts 4, the bracing member 3 is provided adjacent to each end with two sets of holes 5, disposed at different distances from the adjacent end of the member. When the frames 1 are to be spaced farther apart, the bolts 4 are withdrawn from the holes in which they are disposed, and are extended through the outer holes 5. By means of the two side members being releasably connected together by the removable roof, the trap is rendered easily portable and adapted for compact storage, when not in use. Furthermore the trap is easily assembled and set up for use.

Each frame 1 is provided with a plurality of compartments 6, having open sides communicating with the passage 2. Each compartment 6 has two outwardly converging walls 7 and 8, which at their outer ends are spaced apart to form a vertical fly exit 9.

In the drawing, each frame is shown provided with four compartments 6, the oblique walls 8 at each side of the medial transverse vertical plane of the frame being extended outwardly toward the said medial plane.

Respectively pivoted to the frames 1 on vertical axes in said medial plane are two brushes 10, which are adapted to swing in either direction across said plane, for the purpose of brushing flies from small animals, such as sheep or hogs, or from the legs of horses or cows. Each brush 10 has fastened to it two oppositely extending coil springs 11, which are secured respectively to the adjacent frame 1 at opposite sides of the brush. These springs 11 serve to normally swing the brushes 10 to the medial transverse position shown in the drawings.

Figure 2:
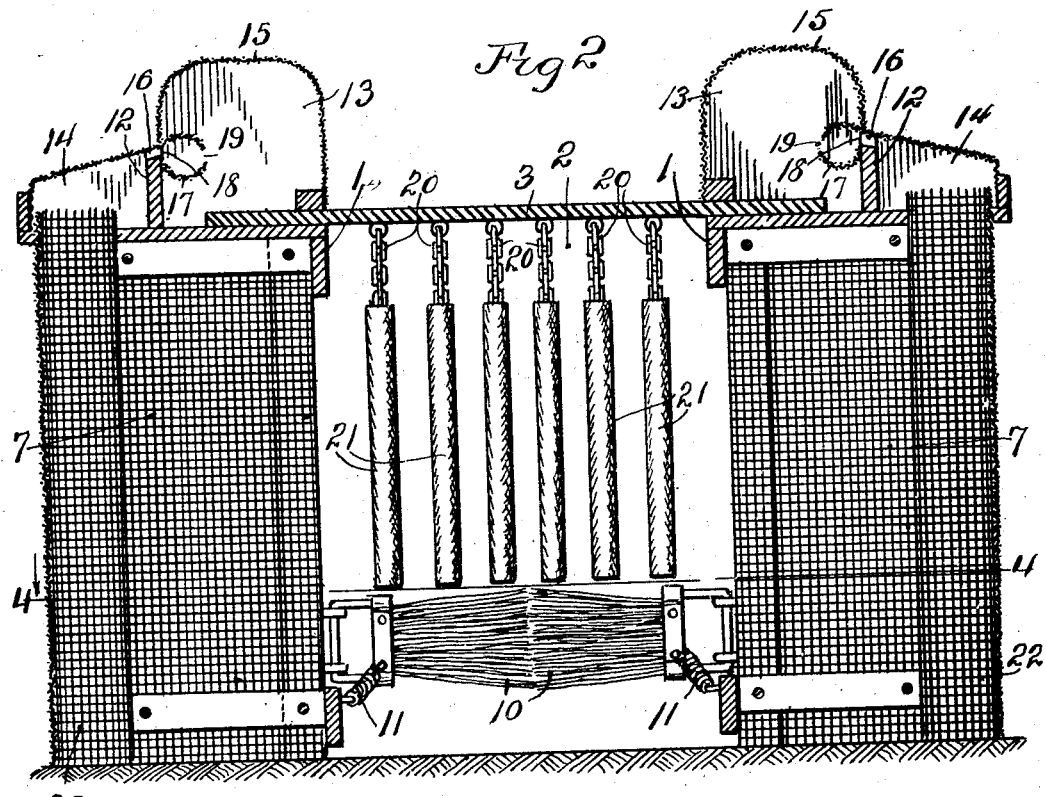
Fig. 2 is a vertical sectional view of my improved trap on the plane of the line 2—2 of Fig. 4.
Figure 3:
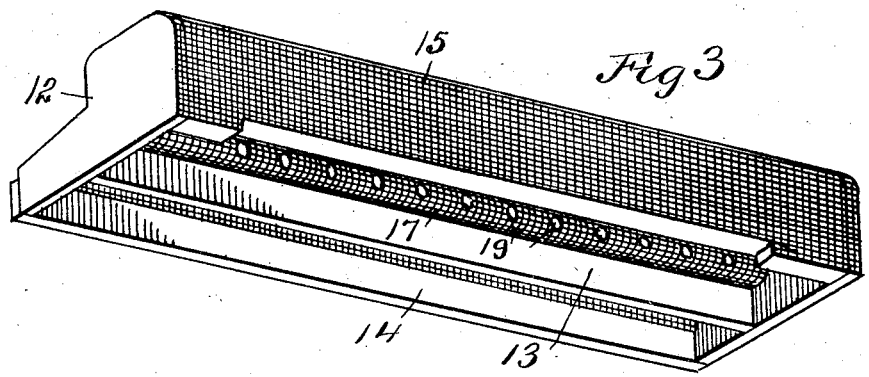
Fig. 3 is a perspective view of one of the housings for receiving and trapping the flies.

Two housings, Figs. 1, 2 and 3, are respectively mounted on the frames 1. Each housing comprises a frame 12 having a fly receptacle 13 and a longitudinal passage 14 for flies, said passage and receptacle being provided with a screen covering 15. Connecting the passage 14 and receptacle 13 is a longitudinal opening 16, Fig. 2, which is controlled by fly trapping means which permits the flies to pass from the passage 14 through the opening 16, but which prevents the return of the flies through said opening. Such trapping means may comprise, as shown, a longitudinal screen tube 17 in the receptacle 13 having a longitudinal opening 18 which communicates with the opening 16. The screen tube 17 has a longitudinal row of exit openings 19 which communicate with the interior of the receptacle 13.

Suspended from the roof member 3 are chains 20 disposed in a transverse row above the brushes 10. The chains 20 may have respectively fitted on them soft rubber tubes 21.

For conducting flies from the exits 9 into the passages 14, there are provided attached to each frame 1 vertical screen tubes 22, each of which has at its inner side a vertical entrance passage 23, said passages respectively aline with the exits 9 with which they communicate. The upper end portions of the screen tubes 22 respectively extend through vertical holes provided therefore in the upper ends of the frames 1 into the passages 14 adjacent thereto.

In assembling the trap, the frames 1 are set the desired distance apart, after which the roof 3 is mounted thereon and fastened thereto by the bolts 4. The housings are then respectively mounted on the frames.

The animals may pass through the passage 2 in either direction, and in passing the brushes 10 and chains 20, the flies will be brushed from the animal and will fly sidewise and enter the compartments 6, and will be guided by the screen walls 7 and 8 to the exits 9, will enter the screen tubes 22 and will pass into the adjacent passages 14, thence through the opening 16, adjacent thereto, into the adjacent screen tube 17, and thence into the adjacent receptacle 13 through the exit openings 19. The flies are thus trapped in the receptacles 13, where they will die. The screen tubes 17 trap the flies and prevent their return into the passages 14.

The housing frames 12 are removable for the purpose of removing the dead flies.

It will be noted that the roof 3 does not cover the end portions of the passage 2. This is to permit access of light from above, so that the flies will stay on the animal until the latter has fully entered the passage, It has been observed that when brushed from an animal, flies ordinarily fly laterally from the animal and not upwardly. As the converging walls 7 and 8 are of screen wire, which permits the passage of light therethrough, the brushed-off flies in flying laterally from the animal will be attracted by the light passing through the screen walls, and will enter the compartments 6 and will be guided by the walls 7 and 8 to the exits 9. It has been further observed that flies on alighting nearly always travel upwardly, so that after entering the vertical screen tubes 22, they will travel upwardly into the passages 14. The openings 16 are disposed next to the screen covering 15, so that the flies will naturally seek this outlet from the passage into the trapping tubes 17. The trapping tubes 17 are relatively of small diameter, so that the flies will not collect therein in large numbers, but will seek an exit therefrom, which they will find in the relatively small openings 19. They will not try to leave the relatively large receptacles 13 to enter the small tubes 17, so will be trapped in said receptacles.

By having the walls 7 and 8 converging, the flies will be quickly guided to the exits 19, instead of flying aimlessly around the compartments 6.

After having been driven through the passage 2, a few times, the animals soon learn that by going through the trap, they can free themselves of flies, and will thereafter voluntarily pass through the trap when troubled with flies or other winged insects. Animals usually hesitate to enter a passage which is closed at either end and through which they cannot see a way of exit. In my improved construction the passage 2 is straight and open at both ends, so that animals will freely enter the trap from either end.

I do not limit my invention to the structure shown and described, as many modifications, within the scope of the appended claims, may be made without departing from the spirit of my invention.

What I claim is:—

1. In a fly trap, two frames spaced apart and adjustable toward and from each other, a roof connecting said frames, fly trapping means, each frame having a compartment having an open side opposite the open side of the other compartment, each compartment having a fly exit, fly conducting means connecting said exits respectively with said fly trapping means, and means between said frames for brushing flies from animals passing between said frames.

2. In a fly trap of the kind described, two spaced frames forming between them a straight open passage for animals through which the animals may pass in either direction, fly brushing means in said passage substantially centrally located therein, each frame having at opposite sides respectively of said fly brushing means fly receiving compartments each of which has a stationary screen wall which diverges laterally outwardly from said passage and from the adjacent end of said passage, and a stationary screen wall extending transversely inwardly from the outer end of said diverging screen wall toward and terminating short of said passage, and means communicating with said compartments for trapping flies entering and passing laterally outwardly from said compartments.

3. In a fly trap of the kind described, the combination with two self contained side frames, each having a fly receiving compartment having a fly exit, of a roof on said frames connected thereto by removable bolts which permit of detachment of the frames from each other as units, chains suspended from said roof adapted to brush flies from animals passing through the passage between said frames, two brushes respectively pivoted to the two frames so as to swing in either direction from a medial transverse plane across said frames, and springs for forcing said brushes normally to the medial position, in which, when the roof is attached to the frames, the brushes will aline with each other.

In testimony whereof I have signed my name to this specification.

JOHN O. COX.